(12) United States Patent
Wakana

(10) Patent No.: US 6,733,407 B2
(45) Date of Patent: May 11, 2004

(54) BELT DRIVING APPARATUS

(75) Inventor: Takashi Wakana, Tokyo (JP)

(73) Assignee: OKI Data Corporation, Tokyo (JP)

( * ) Notice: Subject to any disclaimer, the term of this patent is extended or adjusted under 35 U.S.C. 154(b) by 10 days.

(21) Appl. No.: 09/896,115

(22) Filed: Jul. 2, 2001

(65) Prior Publication Data

US 2002/0046932 A1 Apr. 25, 2002

(30) Foreign Application Priority Data

Jul. 7, 2000 (JP) ........................................ 2000-206928

(51) Int. Cl.[7] ................................................ F16H 57/00
(52) U.S. Cl. .......................................... 474/92; 198/497
(58) Field of Search ........................ 474/92, 100, 246, 474/102, 106, 122; 15/256.5; 198/494, 497, 499; 399/165, 313; 226/15, 17

(56) References Cited

U.S. PATENT DOCUMENTS

| | | | | |
|---|---|---|---|---|
| 4,407,580 A | * | 10/1983 | Hashimoto et al. | 399/313 |
| 5,017,969 A | * | 5/1991 | Mitomi et al. | 198/835 |
| 5,349,428 A | * | 9/1994 | Derrick | 15/100 |
| 5,481,338 A | * | 1/1996 | Todome | 198/806 |
| 5,873,016 A | * | 2/1999 | Kurokawa et al. | 399/297 |
| 5,991,575 A | * | 11/1999 | Okiyama et al. | 198/806 |

* cited by examiner

*Primary Examiner*—Thomas R. Hannon
*Assistant Examiner*—Vicky A. Johnson
(74) *Attorney, Agent, or Firm*—Rabin & Berdo, PC

(57) ABSTRACT

A belt-driving apparatus has a belt in the shape of an endless loop. The belt has an outside surface and inside surface, and a guide belt that is formed on the inside surface. The belt is entrained about a roller with the inside surface in contact with the roller. A pulley is mounted at least on one axial end of the roller, the pulley having a circumferential groove formed therein that receives the guide belt therein. A resilient member that urges the first surface of the belt in such a direction that the guide belt enters the groove. The roller may have a circumferential groove formed therein to receive the guide belt, thereby eliminating the pulley.

18 Claims, 11 Drawing Sheets

BELT DRIVING APPARATUS

BACKGROUND OF THE INVENTION

1. Field of the Invention

The present invention relates to a belt-driving apparatus that drives a belt such as a transfer belt incorporated in an electrophotographic recording apparatus.

2. Description of the Related Art

FIG. 13 is a perspective view of a conventional belt-driving apparatus for use in an electrophotographic printer.

Referring to FIG. 13, a belt 1 is in the form of an endless belt and has a width greater than a maximum length of a printed line of an electrophotographic printer, not shown. The belt 1 is entrained about idle rollers 3, 4, and 5, and a drive roller 6, and runs at a constant speed in a direction shown by arrow C. A spring, not shown, maintains moderate tension in the belt 1 at all times. The belt 1 has an endless guide belt 2 that is attached to the inside surface of the belt 1. The guide belt 2 extends along the lateral ends portion of the belt 1 to describe a loop. The drive roller 6 has a surface made of a highly frictional material.

The idler roller 4 rotates about a shaft, not shown, on which pulleys 8 rotate freely. The pulley 8 is formed with a circumferential groove 26 therein having depth and width that are sufficient to receive the guide belt 2 therein. The groove 26 is tapered such that the groove 26 is wider at its opening than at its bottom. When the guide belt 2 is received in the groove 26, the belt 1 is ready to run properly.

The operation of the conventional belt-driving apparatus will now be described. When the drive roller 6 is driven in rotation by a drive source, not shown, the frictional force and the angle of contact between the belt 1 and the drive roller 6 cause the belt 1 to run in the direction shown by arrow C. When the belt 1 becomes skewed due to mechanical distortions of the system and variations of length of the belt 1 across the width of the belt 1, the guide belt 2 received in the groove 26 effectively alleviates the influence of the skewing problem to some extent.

However, too large an amount of skewing causes the guide belt 2 to exert a large force on the side wall of the groove 26, so that the guide belt 2 will climb the tapered side wall of the groove 26 to move out of the groove 26.

SUMMARY OF THE INVENTION

An object of the present invention is to provide a belt-driving apparatus in which the guide belt attached to an endless belt such as a transport belt is prevented from coming off the guide groove.

An object of the present invention is to provide a belt-driving apparatus in which the belt is prevented from becoming skewed.

A belt-driving apparatus has a belt in the shape of an endless loop. The belt has an outside surface and inside surface, and a guide belt that is formed on the inside surface. The belt is entrained about a roller with the inside surface in contact with the roller. The belt is entrained about the roller with a certain angle of contact. A pulley has a circumferential groove formed therein that receives the guide belt therein, and is mounted on a shaft of the roller. The pulley rotates independently of the roller. A resilient member that urges the first surface of the belt in such a direction as to increase the angle of contact. The roller may have a circumferential groove formed therein to receive the guide belt, thereby eliminating the pulley with a groove.

The resilient member is in pressure contact with the outside surface at a position between a first position and a second position to urge the outside surface of the belt toward the inside surface the belt. The first position is such that the guide belt is about to run into the groove of the pulleys and the second position is such that the guide belt has been completely received in the groove.

The resilient member may be in the shape of a plate that extends substantially parallel to an axial direction of the roller over a distance longer than a width of the belt.

The resilient member may be a cleaning blade that cleans the outside surface of the belt.

The roller, pulley, and resilient member are supported on a supporting member that may be urged by an urging member in such a direction as to maintain tension in the belt.

Instead of incorporating the pulley, the apparatus may have a groove formed in the roller. The groove may have a depth greater than a height of the guide belt such that there is a clearance between a bottom of said groove and a top of the guide belt.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

The present invention will be described in detail with reference to the accompanying drawings.

First Embodiment

Figure 1:
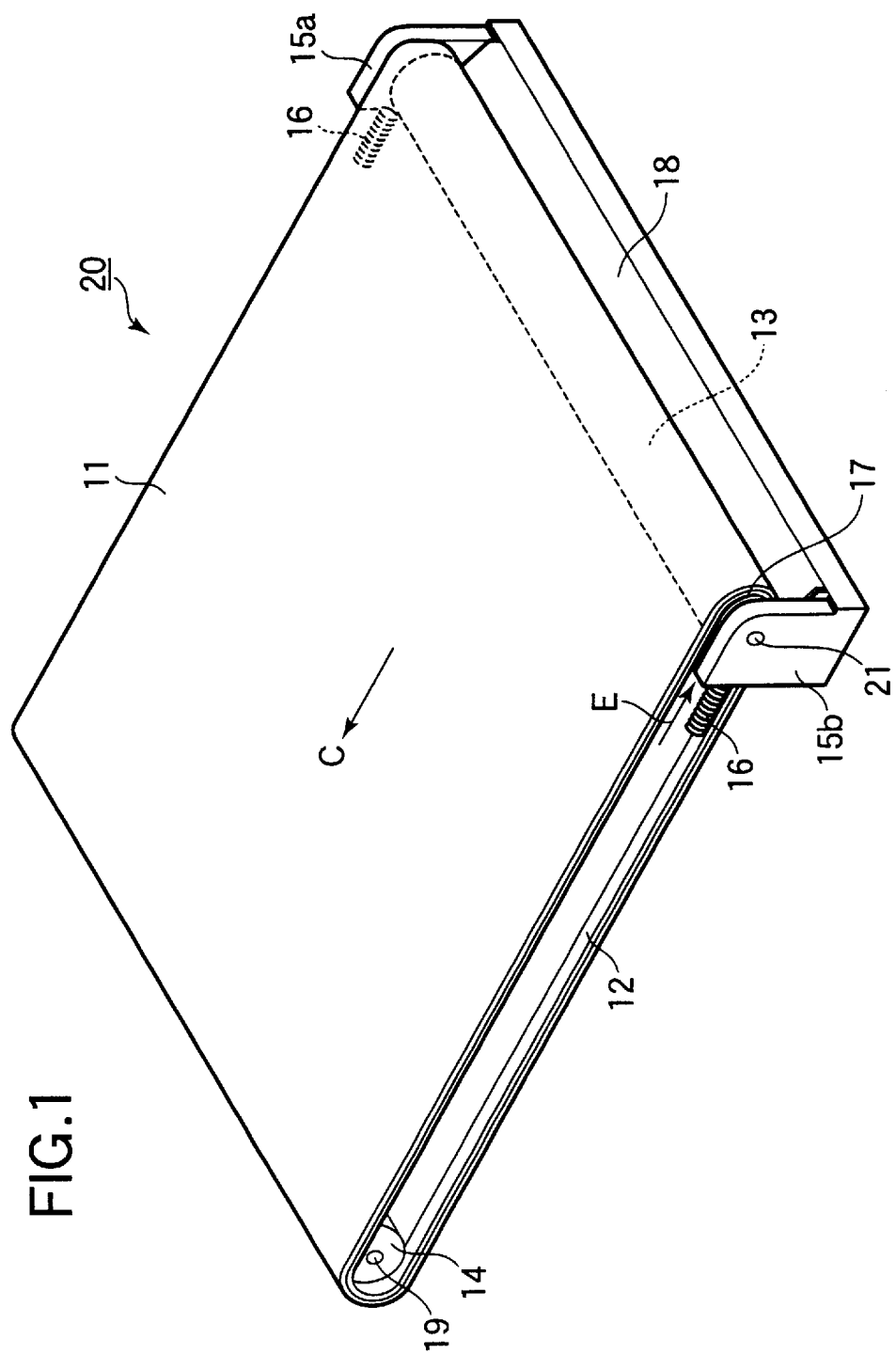
FIG. 1 is a perspective view of a belt driving apparatus according to a first embodiment.

FIG. 1 is a perspective view of a belt-driving apparatus according to a first embodiment.

Figure 2:
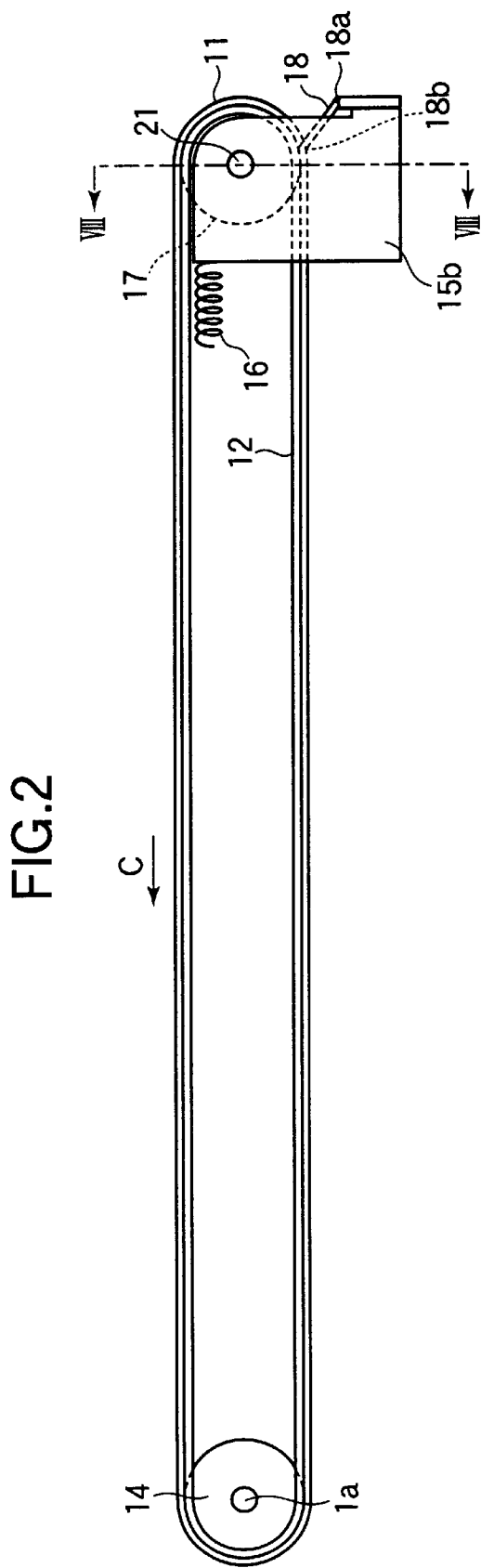
FIG. 2 is a side view of the belt-driving apparatus according to the first embodiment.

FIG. 2 is a side view of the belt-driving apparatus according to the first embodiment.

A belt-driving apparatus 20 is incorporated in an electrophotographic printer, not shown.

Referring to FIGS. 1 and 2, there are structural elements of a print engine including a photoconductive drum, not shown, above a belt 11. The belt 11 describes a loop and has a width greater than a maximum length of a printed line of an electrophotographic printer, not shown. The belt 11 is entrained about idle rollers 13 and a drive roller 14 and runs at a constant speed. The idler roller is made of a metal material such as aluminum. The drive roller 14 is mounted on a shaft 19 that is rotatably supported on a frame of the printer, not shown. Compressed springs 16 (only one spring is shown in FIG. 1) urge supporting members 15a and 15b in a direction shown by arrow E to maintain moderate tension in the belt at all times. The belt 11 has guide belts 12 that are attached to the inner surface of the belt 11. The guide belts 12 run along the lateral end portions of the looped belt 11 to describe a loop. FIG. 1 shows only one of two guide belts. The drive roller 14 has a surface made of a highly frictional material. The drive roller 14 is slightly shorter than the width of the belt 11 such that the drive roller 14 does not interfere with the guide belt 12.

A cleaning blade 18 is mounted at its one end 18a to the supporting members 15a and 15b and contacts the belt 11 at its other end, i.e., free end 18b. The cleaning blade removes foreign material deposited on the belt 11. The cleaning belt 18 has a width the same as or slightly greater than that of the belt 11 and extends across the width of the belt 11. The cleaning belt 18 is a plate of a resilient material such as urethane and resiliently abuts the belt 11.

Figure 3:
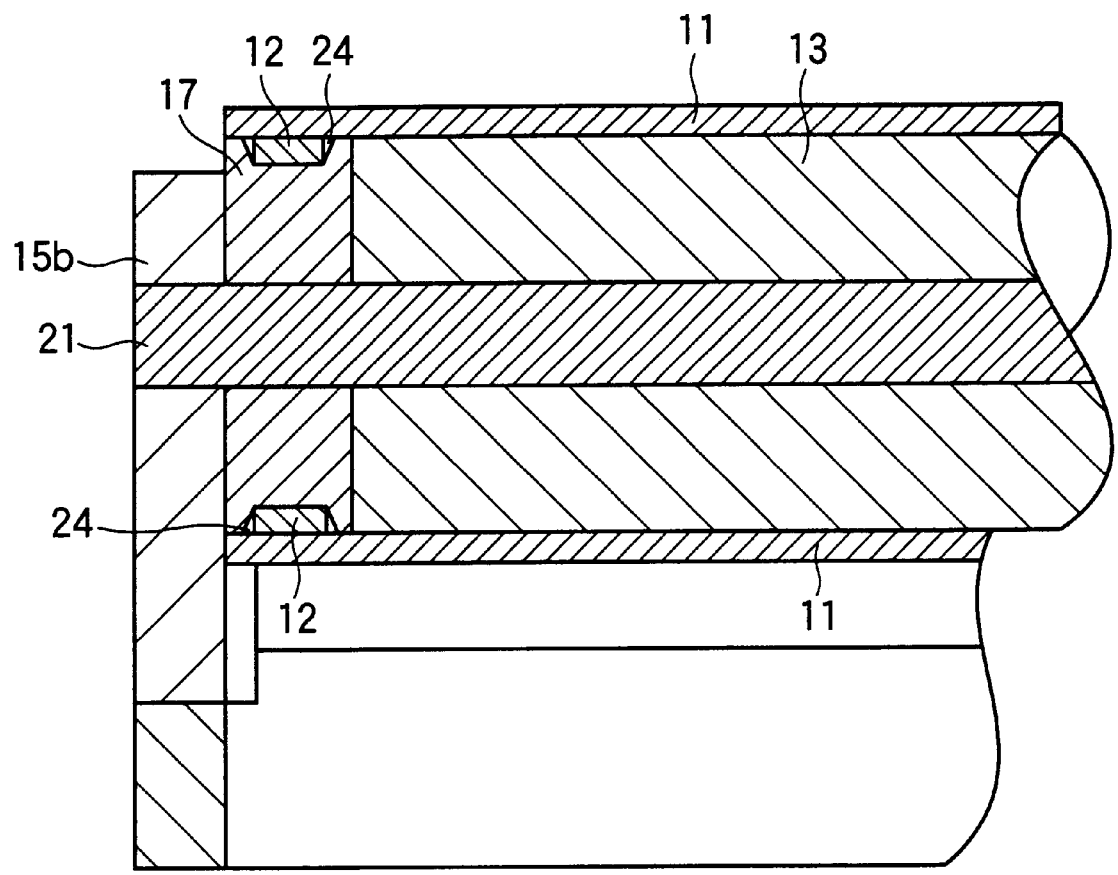
FIG. 3 is a cross-sectional view taken along lines VII—VII lines of FIG. 2.

FIG. 3 is a cross-sectional view taken along lines D—D of FIG. 2.

The idle roller 13 is mounted on a shaft 21 that is rotatably supported by the supporting members 15a and 15b.

Pulleys 17 are rotatably mounted on the shaft 21 with the roller sandwiched therebetween and rotate freely independently of the idle roller 13. As used herein, the idle roller, they pulleys, and the unit of the idle roller and the pulleys, may each be referred to as a driven roller, or as a driven roller unit. The pulley 17 is formed with a circumferential groove 24 therein. The depth and width are sufficient to loosely receive the guide belt 2 therein. The groove 24 is tapered such that the groove 24 is wider at toward the opening and narrower toward the bottom. When the guide belt 2 is received in the groove 24, the belt 1 is ready to run properly.

Figure 4:
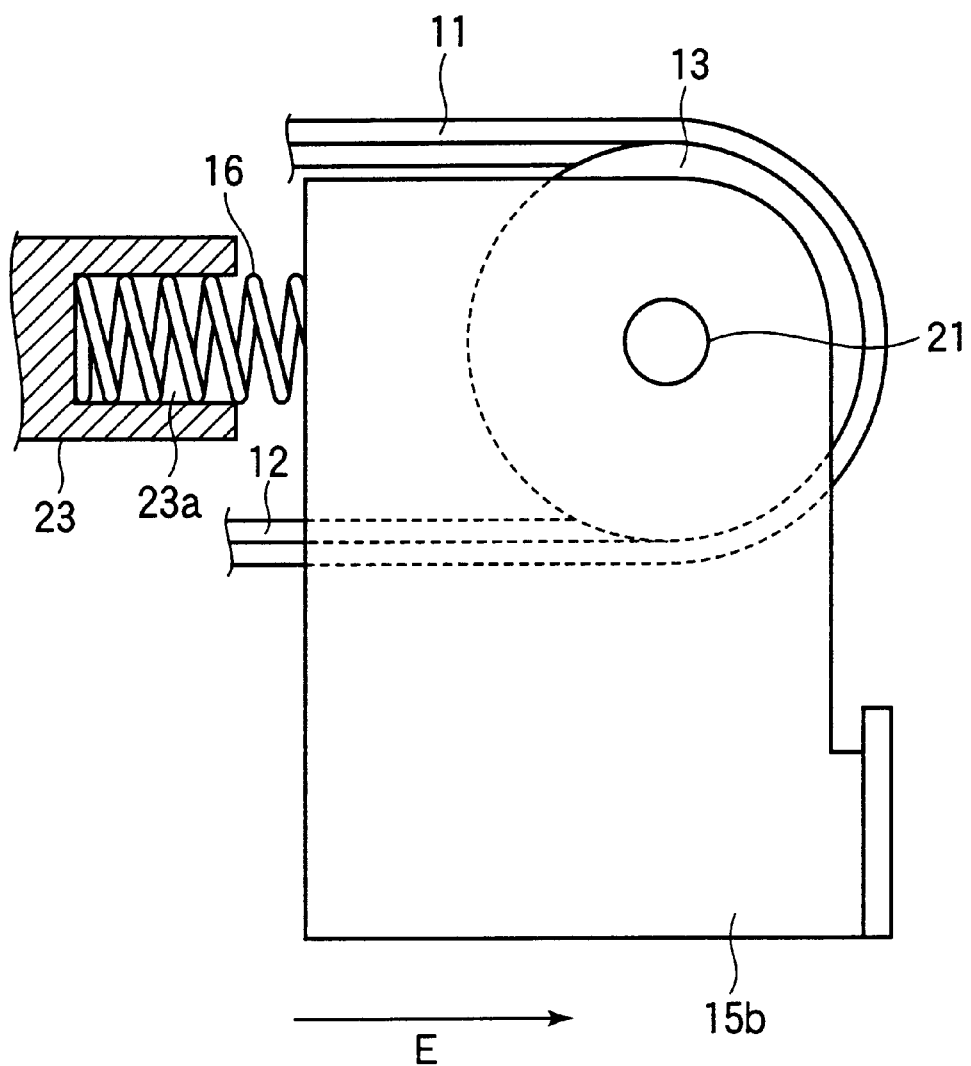
FIG. 4 is an enlarged view of the spring and guide members 15a and 15b.

FIG. 4 is an enlarged view of the spring and guide members 15a and 15b.

The supporting members 15a and 15b are movably supported on the frame of the printer, not shown. Each of the springs 16 is loosely received in a cylindrical hole 23a formed in a frame 23 so that the spring can be compressed and stretched. The spring 16 has one end that engages a bottom of the hole 23a, and another end that engages the supporting member 15a or 15b so that the supporting members 15a and 15b are urged in the direction shown by arrow E to apply tension to the belt 11. Thus, the belt 11 can run without slack therein.

Figure 5:
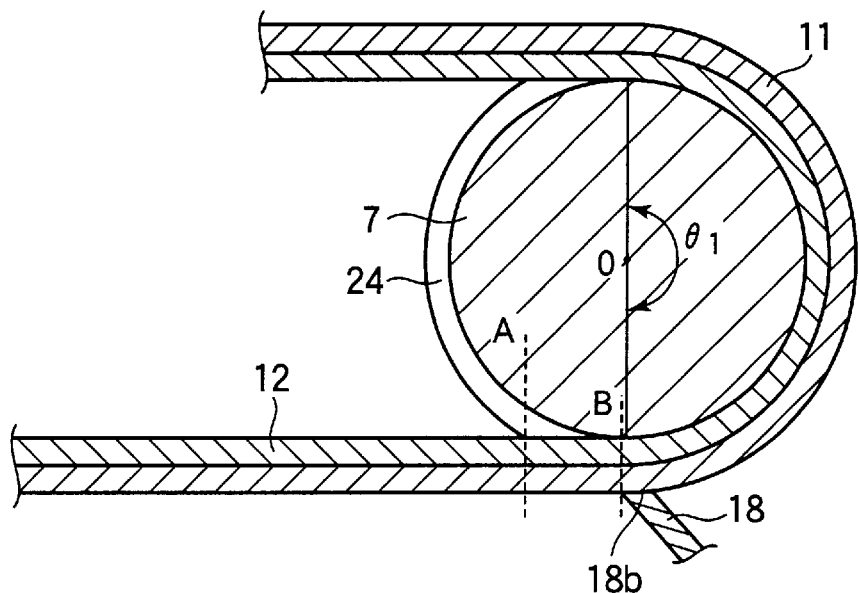
FIGS. 5–7 are cross-sectional views illustrating the relation among the belt 11, guide belt 12, and cleaning blade 18 according to the first embodiment.
Figure 6:
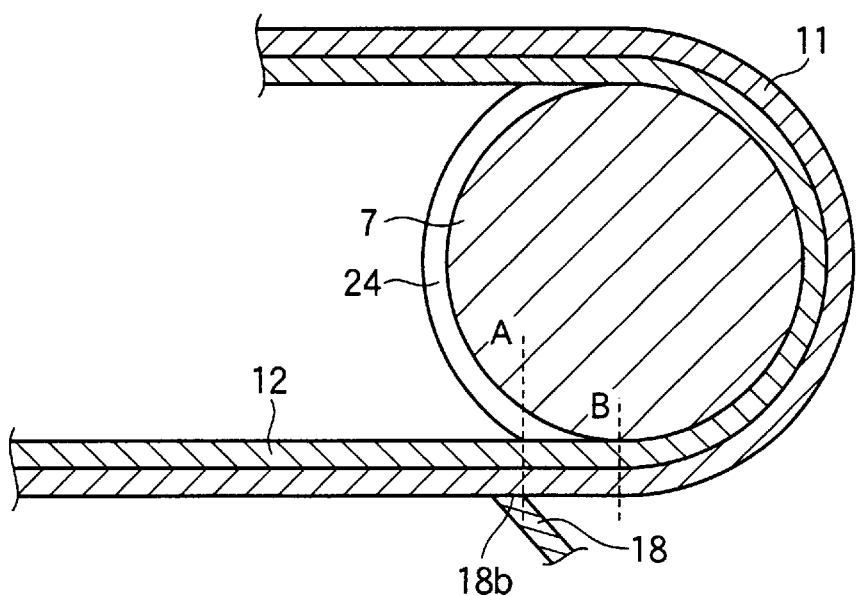
Figure 7:
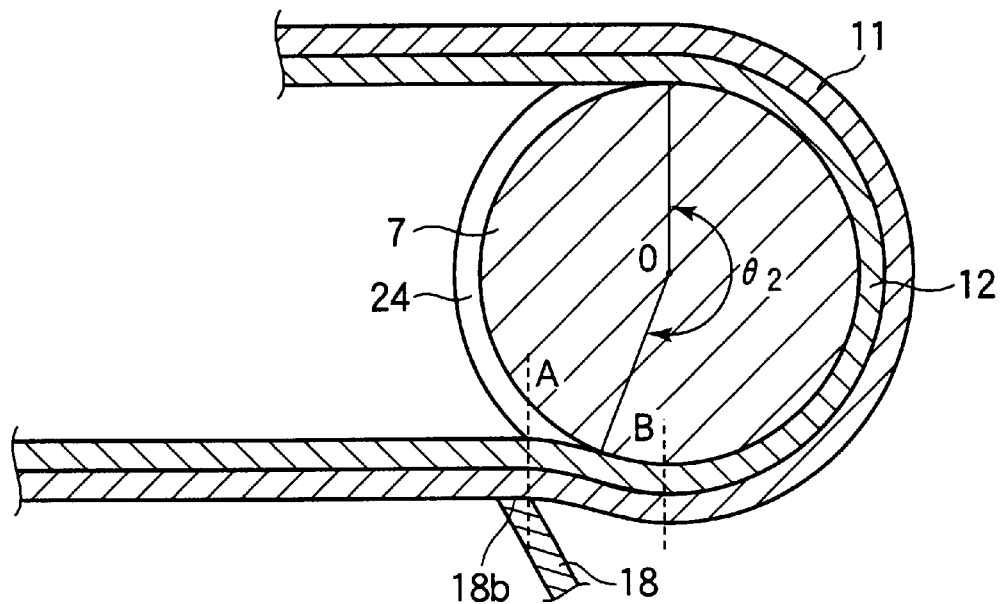

FIGS. 5–7 are cross-sectional views illustrating the relation among the belt 11, guide belt 12, and cleaning blade 18 according to the first embodiment.

The belt 11 wraps around the pulley 7 by an angle of contact of $\theta 1$. As shown in FIG. 7, the free end 18b is brought into contact with the belt 11 so that at least a part of the free end is disposed somewhere between a position A depicted by arrow A and a position B depicted by arrow B. The position A is a position where the guide belt 12 is about to enter the groove 24 of the pulley 17 and the position B is a position where the guide belt 12 is completely received in the groove 24.

The aforementioned structural elements form a belt-driving apparatus 20. There is no pulley provided on the shaft 19 and the drive roller 14 is shorter than the width of the belt 11 so that the drive roller 14 does not interfere with the guide belt 12.

The operation of the belt-driving apparatus according to the first embodiment will now be described with reference to FIGS. 5–7.

Referring back to FIG. 1, when the drive roller 14 is driven in rotation by a drive source, not shown, the angle of contact and the frictional force between the drive roller 14 and the belt 11 cause the belt 11 to run in the direction shown by arrow C. The guide belt 12 received in the groove 24 also runs and therefore the belt 11 continues to rotate with stability. The skew problem of the belt 11 results from the mechanical distortions of the system and the variation of circumferential length of the belt 11 across the width of the belt 11. When the belt 11 becomes skewed, the guide belt 12 received in the groove 24 moves in the direction of the skewing until it presses the tapered side wall of the groove 24. A further force exerted on the tapered side wall will produce a force that causes the guide belt 12 to climb the tapered side wall.

The force that causes the guide belt 12 to climb the tapered side wall acts on a portion where the belt 11 is about to contact the idle roller 13. The springs 16 exert a tensile force on the belt 11, the tensile force resulting in a force that tends to suppress the force that causes the guide belt 12 to climb the side wall of the groove 24. However, the suppressing force created by the urging force of the springs 16 is not large enough to completely overcome the climbing force resulting from the skewing problem.

In the present embodiment, the cleaning blade 18 is disposed such that at least a portion of the free end 18b of the blade 18 contacts the belt 11 at a position between position A and position B. The cleaning blade 18 tends to push the guide belt 12 into the groove 24, thereby preventing the guide belt 12 from overriding the side wall of the groove 24. Thus, the cleaning blade 18 allows for proper engagement of the guide belt 12 with the grooves 24 of the pulleys 17.

If the free end 18a of the cleaning blade 18 is in contact with the belt 11 at a position downstream of the position B (FIG. 5) with respect to the direction in which the belt 11 runs, the guide belt 12 cannot be properly pulled into the groove 24.

If the free end 18a of the cleaning blade 18 is in contact with the belt 11 at a position upstream of the position A (FIG. 6), the guide belt 12 may not be properly pulled into the groove 24.

Referring to FIG. 7, the cleaning blade 18 pushes the belt 11 in such a direction as to increase an angle of contact $\theta 2$ by which the belt 11 contacts the pulley 7. If the force that cleaning blade 18 pushes the belt 11 and guide belt 12 changes, then the cleaning blade 18 may press the belt 11 at somewhat shifted positions. Thus, the cleaning blade 18 should be disposed such that even if the cleaning blade may press the belt 11 at somewhat shifted positions, the free end 18a is still between the position A and position B.

Figure 8:
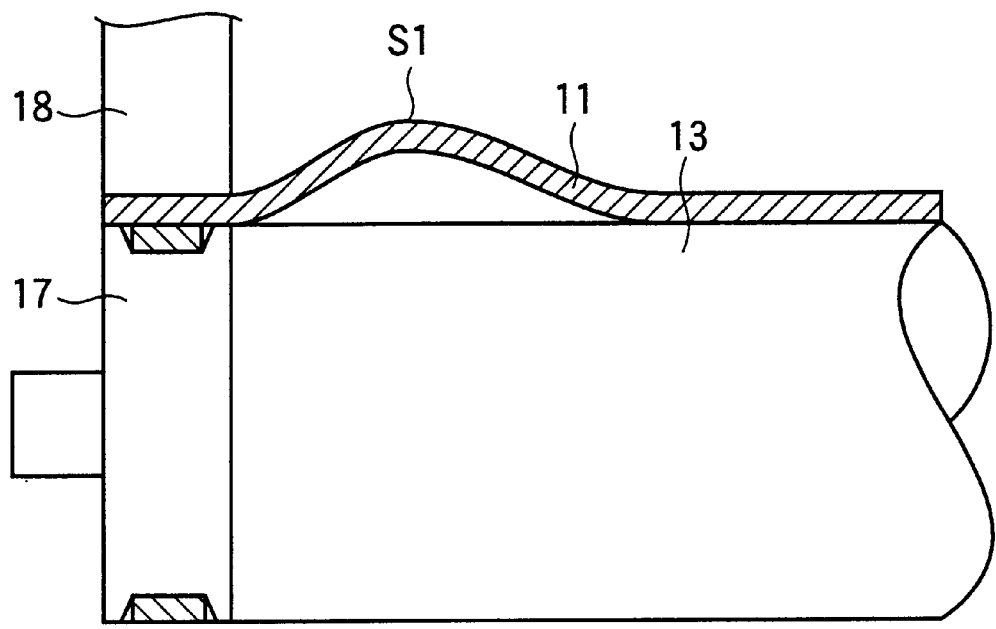
FIG. 8 illustrates a cleaning blade having a much narrower width than the belt.

FIG. 8 illustrates a cleaning blade having a much narrower width than the belt.

If the cleaning blade 18 has a width that is the same as or slightly larger than the thickness of the pulley 17 as shown in FIG. 8, then the cleaning blade 18 presses only a part of the belt 11 against the pulley. As a result, the belt 11 will have slack S1 therein that extends across its width and results in unstable running of the belt 11. Therefore, the cleaning blade should have a dimension such that the cleaning blade 18 presses the belt 11 evenly all across the width of the belt 11.

Figure 9:
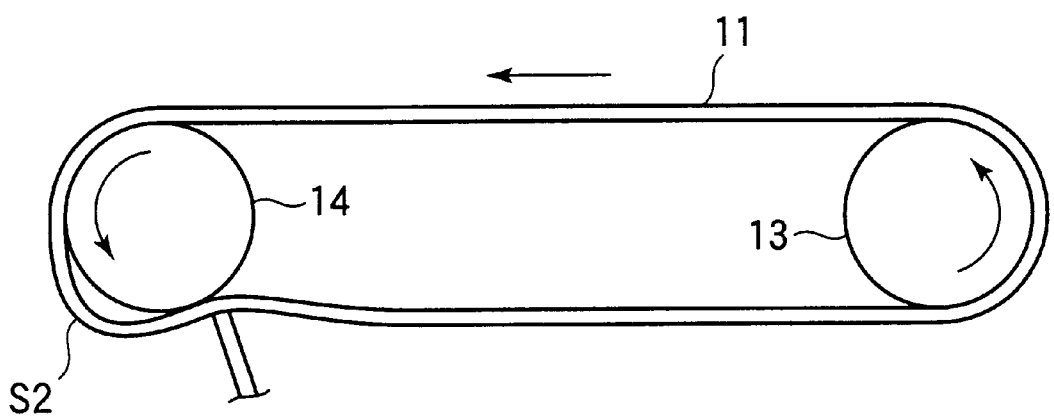
FIG. 9 illustrates a blade disposed near the drive roller.

FIG. 9 illustrates a blade disposed near the drive roller.

The groove 24 should preferably be formed in a member other than the drive roller 14. As shown in FIG. 9, if the groove 24 is formed in the drive roller 14 and the cleaning blade 18 is pressed against the drive roller 14, then the force exerted by the cleaning blade 18 on the belt 11 causes the belt 11 to have slack S2 therein around the drive roller 14. This slack S2 prevents the belt 11 from firmly holding the driver roller 14, resulting in slippage of the belt 11 around the drive roller 14.

In the first embodiment, the cleaning blade 18 applies a uniform pressing force across the width of the belt 11, thereby minimizing the chance of the belt 11 becoming wavy in the running direction so that the skewing force is not concentrated at one location. The cleaning blade 18 plays two roles: a cleaning member for cleaning the surface of the belt 11 and a pressing member for pressing the guide belt 12 toward the groove 24. Thus, providing the cleaning blade 18 eliminates the need for providing a member that presses the guide belt 12 against the groove 24.

Figure 10:
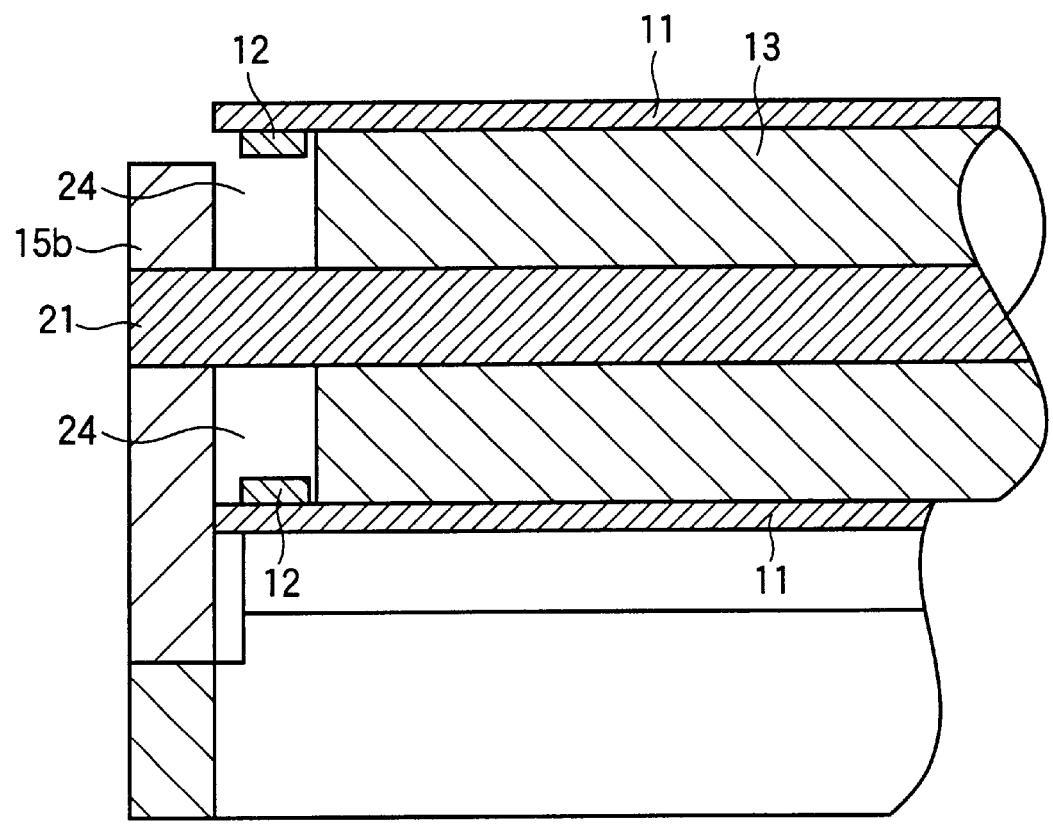
FIG. 10 illustrates a modification to the first embodiment.

FIG. 10 illustrates a modification to the first embodiment.

Referring to FIG. 10, there is no pulley provided. The guide belt 12 is attached to the inner surface of the belt 11 at opposing end portions of the width such that the roller 13 extends between the endless guide belts. The guide belt 12 serves to limit the width-wise position of the belt 13 relative to the roller 13.

Second Embodiment

In the first embodiment, the pulleys 17 are rotatably mounted on the shaft 21 of the idle roller 13 and rotate independently of the idle roller 13. The groove 24 has a depth substantially equal to the height of the guide belt 12.

The belt 11 is guided by the guide belt 12 received in the groove 25.

When the drive roller 14 is driven in rotation by a drive source, not shown, the angle of contact of the belt 11 and the frictional force between the belt 11 and the drive roller 14 cause the belt 11 to run in the direction shown by arrow C. Because the depth of the groove 24 is substantially the same as the height of the guide belt 12, the guide belt 12 runs with its upper surface in contact with the bottom of the groove 24.

Therefore, the circumferential velocity of the bottom of the groove 24 is the same as that of the guide belt 12 in contact with the bottom of the groove 24, provided that the guide belt 12 and groove 24 are very accurately dimensioned. However, if the groove 24 is little shallow compared to the height of the guide belt 12, the bottom of the groove 24 pushes up the guide belt 12. In this case, the circumferential velocity of the bottom of the groove 24 is slightly higher than that of the surface of the guide belt 12 in contact with the bottom of the groove 24. Thus, if the pulley 17 is secured to the roller 13 and rotates together with the roller 13, the guide belt 12 and the bottom of the groove 24 rub each other due to the difference in circumferential velocity. The difference in circumferential velocity exerts an undesired load on the guide belt 12. In order to avoid such a load, the pulleys 17 in the first embodiment are constructed to rotate independently of the idle roller 13.

Figure 11:
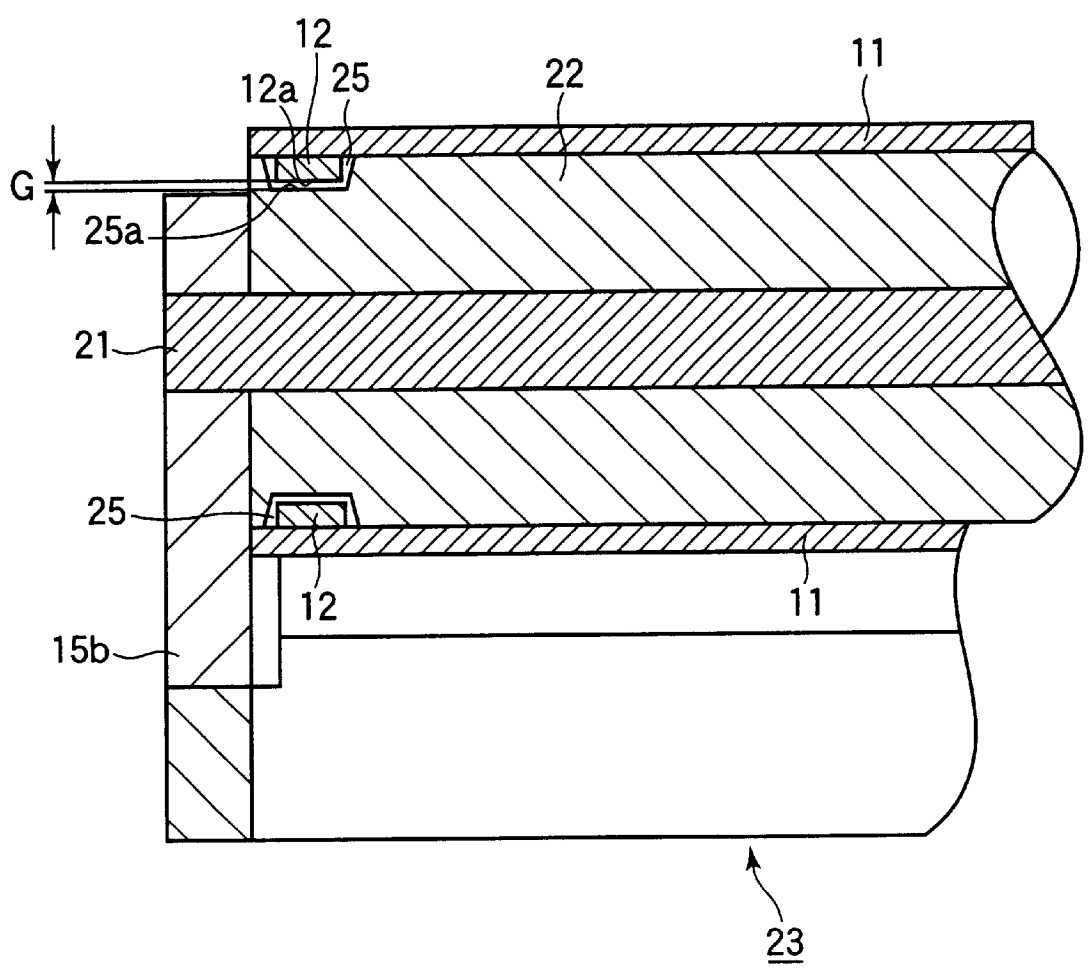
FIG. 11 is a cross-sectional view of a belt driving apparatus according to a second embodiment, taken along lines VII—VII of FIG. 2.

FIG. 11 is a cross-sectional view of a belt-driving apparatus according to a second embodiment, taken along lines VII—VII of FIG. 2.

However, as is clear from FIG. 11, the second embodiment differs from the first embodiment in that a pulley is not used but an idle roller 22 made of aluminum has a groove 25 formed therein. The depth of the groove 25 is greater than the height of the guide belt 12. The groove 25 is tapered from its bottom 25a to its open end. The bottom 25a is a slightly larger width than the guide belt 12. In order to accommodate the dimensional errors of the structural elements, there is provided a gap G between the upper surface 12a of the guide belt 12 and the bottom 25a of the groove 25.

The gap G prevents the upper surface 12a of the guide belt 12 from contacting the bottom 25a of the groove 25. This structure eliminates the problem of the difference in circumferential velocity between the bottom 25a and the surface of the guide roller 22. Thus, pulley and idle roller can be of an integral construction.

Figure 12:
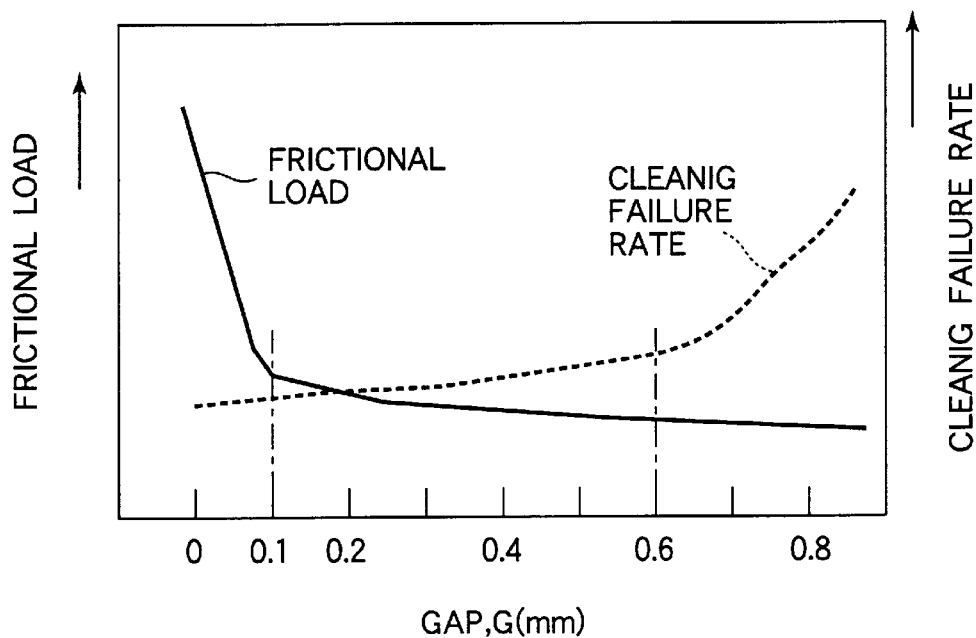
FIG. 12 illustrates the relationship between the gap G and the cleaning failure rate of the belt surface that is cleaned with the cleaning blade, and the relationship between the gap G and the frictional load developed between belt and idler roller.
Figure 13:
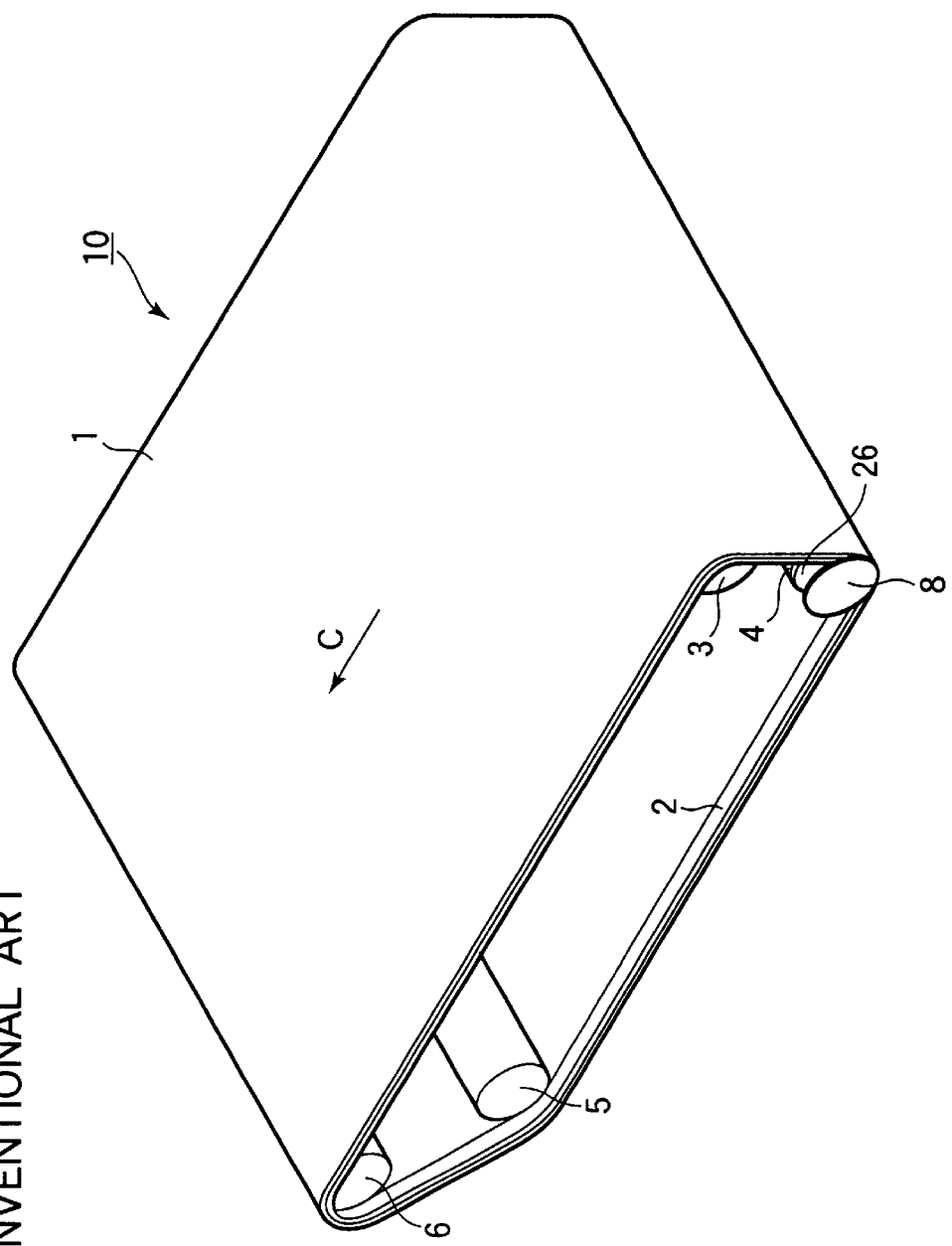
FIG. 13 is a perspective view of a conventional belt-driving apparatus for an electrophotographic printer.

FIG. 12 illustrates the relationship between the gap G and the cleaning failure rate of the belt surface that is cleaned with the cleaning blade, and the relationship between the gap G and the frictional load developed between belt and idler roller.

Too large a value of the gap G allows the guide belt 12 to enter deep into groove 25, the guide belt 12 and belt 11 not resisting sufficiently to the pressing force of the cleaning blade 18. This will not create a sufficient frictional force between the cleaning blade 18 and the belt 11, causing poor cleaning result. The optimum value of the gap G varies depending on the rigidity of the belt 11 and cleaning blade 18 and smoothness of their contact surfaces. The gap G is preferably such that the cleaning failure rate of the surface of the belt 11 and the frictional force between the guide belt 12 and the groove 25 in the idle roller 22 are minimized. Referring to FIG. 12, the cleaning failure rate of the belt surface increases gradually for the gap G=0 to 0.6 mm and rapidly for the gap G greater than 0.6 mm. The frictional load developed between the belt and the idler roller gradually increases for the gap G greater than 0.1 mm and abruptly increases for the H smaller than 0.1 mm. Thus, the value of the gap G should be in the range of 0.1 to 0.6 mm, and preferably about 0.2 mm.

The arrangement, construction, and operation of the cleaning blade, belt, and guide belt are the same as those of the first embodiment and the description thereof is omitted.

The second embodiment eliminates the need for providing a pulley. This leads to reduction of manufacturing costs.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A belt-driving apparatus, comprising:

an endless belt having an inner surface and an opposing outer surface, and having a guide belt formed on the inner surface;

at least a first roller unit and a second roller unit about which said endless belt is entrained, said first roller unit including a drive roller that is driven to rotate by a drive source, said drive roller causing said endless belt to rotate, said second roller unit including a driven roller that is driven to rotate by said endless belt when said endless belt is driven to rotate by said drive roller, a portion of the endless belt upstream of said drive roller and downstream of said driven roller being pulled by said drive roller, and a portion of the endless belt downstream of said drive roller and upstream of said driven roller being pushed by said drive roller, the portion of the endless belt upstream of said drive roller and downstream of said driven roller beginning immediately after the endless belt ends contact with said driven roller and terminating immediately before the endless belt makes contact with said drive roller, when said endless belt is driven to rotate by said drive roller, and the portion of the endless belt downstream of said drive roller and upstream of said driven roller beginning immediately after the endless belt ends contact with said drive roller and terminating immediately before the endless belt makes contact with said driven roller, when said endless belt is driven to rotate by said drive roller, said second roller unit having a guide groove in which the guide belt is received; and a pressure member that presses said endless belt from the outer surface, said pressure member pressing the portion of the endless belt downstream of said drive roller and upstream of said driven roller with respect to a direction in which said endless belt runs.

2. The belt-driving apparatus according to claim 1, wherein the guide groove has a depth greater than a height of the guide belt.

3. The belt driving apparatus according to claim 1, wherein said second roller unit includes an idle roller, the guide groove being formed in the idle roller.

4. The belt driving apparatus according to claim 1, wherein said second roller unit includes an idle roller, and a pulley that rotates together with the idle roller, the guide groove being formed in the pulley.

5. A belt-driving apparatus, comprising:

an endless belt having an inner surface and an opposing outer surface, and having a guide belt formed on the inner surface;

at least a drive roller and a driven roller about which said endless belt is entrained, said driven roller having a receiving portion in which the guide belt is received;

said drive roller being driven to rotate by a drive source, said drive roller causing said endless belt to rotate, said driven roller being driven to rotate by said endless belt when said endless belt is driven to rotate by said drive roller, a portion of the endless belt upstream of said drive roller and downstream of said driven roller being pulled by said drive roller, and a portion of the endless belt downstream of said drive roller and upstream of said driven roller being pushed by said drive roller, the portion of the endless belt upstream of said drive roller and downstream of said driven roller beginning immediately after the endless belt ends contact with said driven roller and terminating immediately before the endless belt makes contact with said drive roller, when said endless belt is driven to rotate by said drive roller, and the portion of the endless belt downstream of said drive roller and upstream of said driven roller beginning immediately after the endless belt ends contact with said drive roller and terminating immediately before the endless belt makes contact with said driven roller, when said endless belt is driven to rotate by said drive roller; and a pressure member that presses said endless belt from the outer surface, said pressure member pressing the portion of the endless belt downstream of said drive roller and upstream of said driven roller with respect to a direction in which said endless belt runs, said pressure member serving as a cleaning member that cleans the outer surface of said endless belt.

6. The belt-driving apparatus according to claim 5, wherein said pressure member is a cleaning blade.

7. The belt-driving apparatus according to claim 5, wherein said drive roller, said driven roller, and said pressure member are supported on a supporting member.

8. The belt-driving apparatus according to claim 7, further comprising an urging member that urges the supporting member in such a direction as to maintain tension in the endless belt.

9. The belt-driving apparatus according to claim 5, wherein said drive roller and said driven roller are provided in such a way that said endless belt is maintained in tension.

10. The belt-driving apparatus according to claim 9, wherein the driven roller is an idle roller.

11. The belt-driving apparatus according to claim 9, wherein said drive roller has a length smaller than a width of said endless belt.

12. The belt-driving apparatus according to claim 11, wherein the ends of the drive roller are spaced away from the guide belt.

13. The belt-driving apparatus according to claim 5, wherein said pressure member is in contact with the outer surface at a position between a first position, and a second position upstream of the first position;

wherein at least a portion of the guide belt is received in the receiving portion between the first position and the second position;

wherein the second position is such that the guide belt has entered at least partly into the receiving portion; and wherein the first position is such that the portion of the guide belt has completely entered into the receiving portion and a portion of the inner surface is tangent to a circumferential surface of said driven roller.

14. The belt-driving apparatus according to claim 13, wherein said pressure member extends at least across a width of the endless belt.

15. The belt-driving apparatus according to claim 14, wherein said pressure member is a cleaning blade that cleans the outer surface of the endless belt.

16. The belt-driving apparatus according to claim 5, wherein said pressure member urges said endless belt so as to increase an angle of contact between said endless belt and the driven roller.

17. A belt-driving apparatus, comprising:

an endless belt having an inner surface and an opposing outer surface, and having a guide belt formed on the inner surface;

at least a first roller and a second roller about which said endless belt is entrained, said second roller having a receiving portion in which the guide belt is received; and a pressure member that presses said endless belt from the outer surface, said pressure member being disposed upstream of said second roller and downstream of said first roller with respect to a direction in which said endless belt runs, said pressure member contacting said endless belt at a position that is between a first position in which said guide belt just begins to enter the receiving portion, and a second position that is prior to the guide belt being completely received by the receiving portion, the first position being disposed upstream of the second position, said pressure member pushing and deflecting said endless belt so as to increase an angle of contact by which said endless belt contacts said second roller, thereby facilitating receipt of said guide belt in said receiving portion.

18. The belt-driving apparatus according to claim 17, wherein said pressure member is a cleaning blade.

* * * * *